Feb. 20, 1968 K. R. JOHNSON ET AL 3,369,577
MECHANISM FOR DISPENSING MEASURED AMOUNTS OF FLUENT MATERIAL
Filed Dec. 31, 1964 3 Sheets-Sheet 1
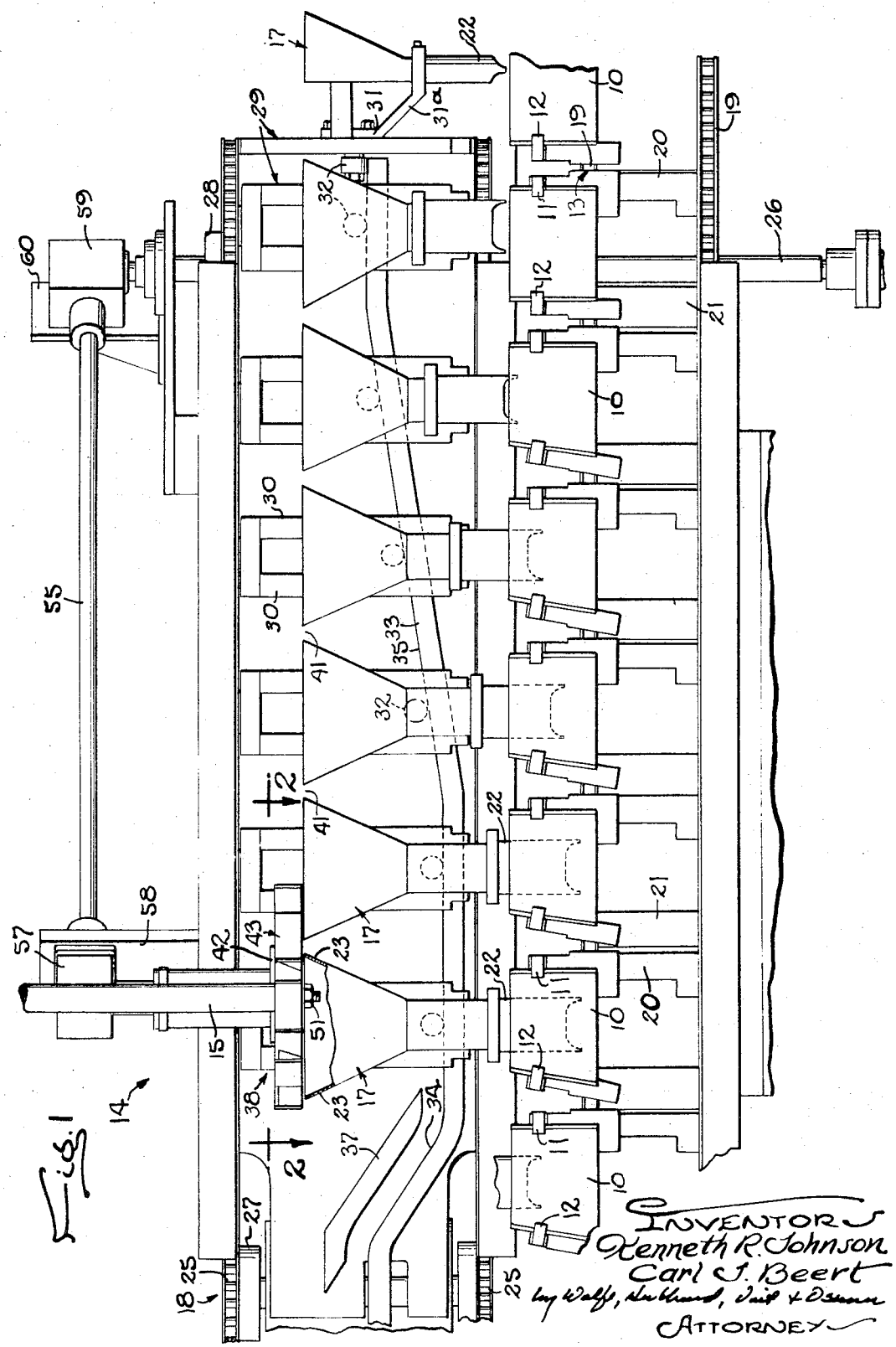
INVENTORS
Kenneth R. Johnson
Carl J. Beert
ATTORNEY

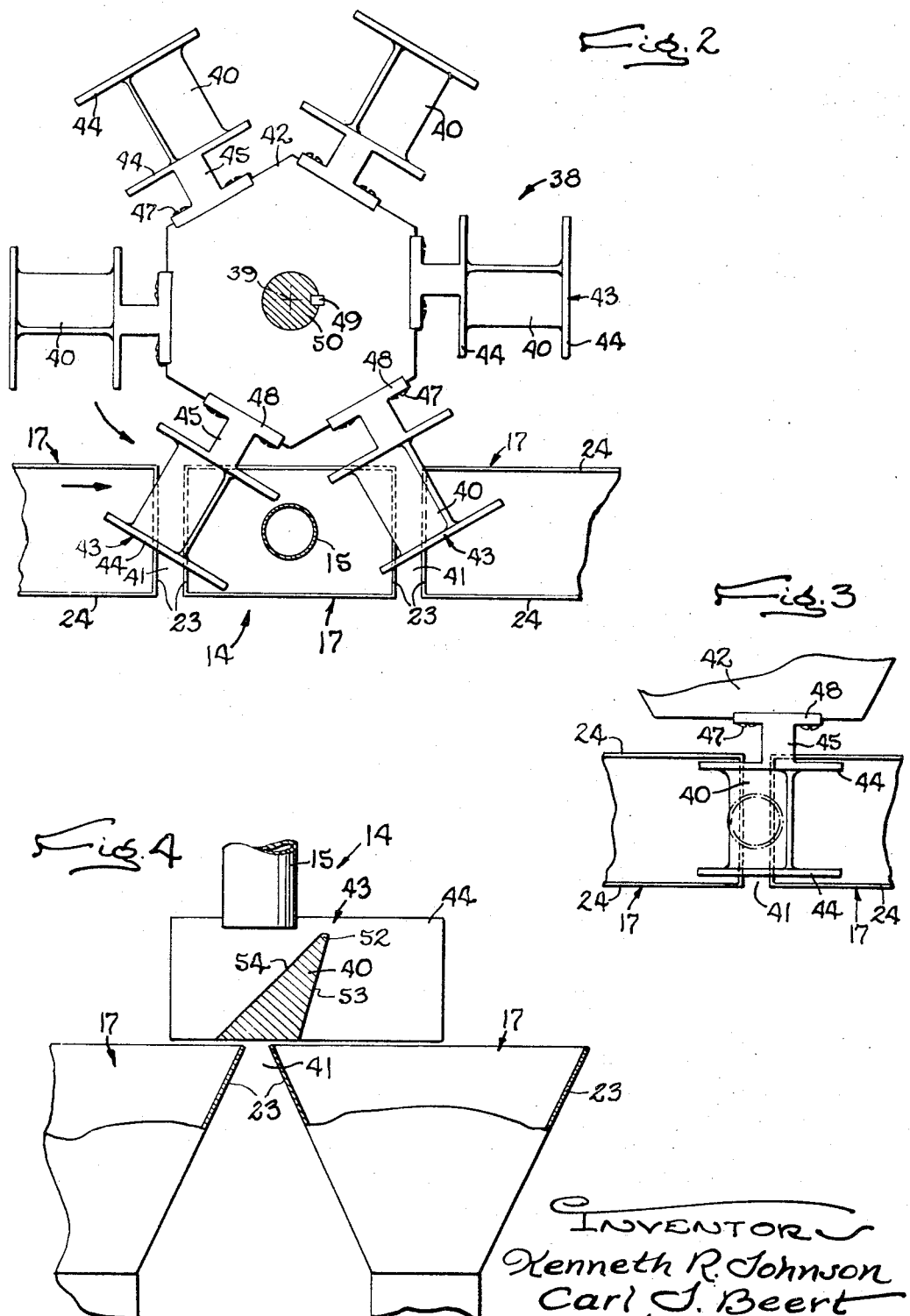

Feb. 20, 1968     K. R. JOHNSON ETAL     3,369,577
MECHANISM FOR DISPENSING MEASURED AMOUNTS OF FLUENT MATERIAL
Filed Dec. 31, 1964     3 Sheets-Sheet 3
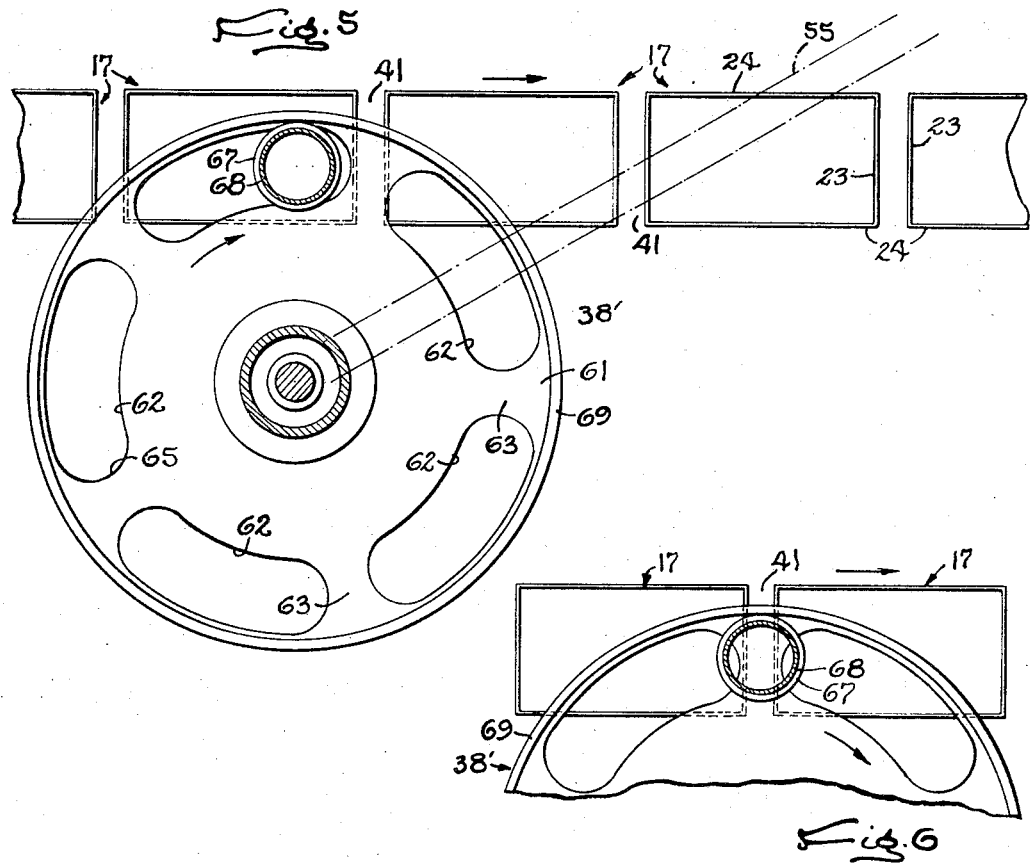
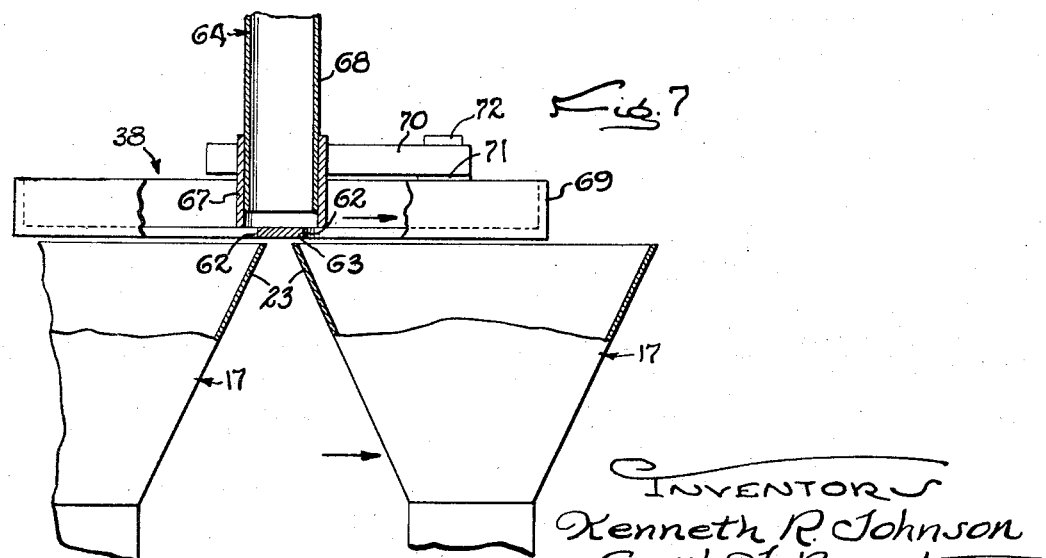
INVENTORS
Kenneth R. Johnson
Carl J. Beert
by Wolfe, Hubbard, Voit & Osann
ATTORNEYS

United States Patent Office 3,369,577
Patented Feb. 20, 1968

3,369,577
MECHANISM FOR DISPENSING MEASURED
AMOUNTS OF FLUENT MATERIAL
Kenneth R. Johnson and Carl J. Beert, Rockford, Ill.,
assignors to Bartelt Engineering Company, Inc., Rockford, Ill., a corporation of Delaware
Filed Dec. 31, 1964, Ser. No. 422,744
8 Claims. (Cl. 141—132)

ABSTRACT OF THE DISCLOSURE

Mechanism for dispensing measured charges of fluent material into funnels supported on an endless carrier to pass through a filling zone and beneath a filling spout delivering a constant volumetric flow of material toward the passing funnels. A measuring device is disposed between the path of the funnels and the spout to divide the flow into sections of equal length whereby each funnel receives a measured amount of material. In the preferred form, the measuring device comprises a body journaled on the machine frame for rotation about a vertical axis alongside of the path of the funnels, and a plurality of radially extending bars of triangular cross sections having vertexes facing upwardly for precise division of the flow. In the modified form, the measuring device is a disk having a series of arcuate dispensing openings equally spaced apart around the periphery of the disk. In each case, the measuring device is rotated continuously in one direction to move successive dispensing openings above the passing funnels and at the speed of the funnels, and the openings are separated by imperforate sections which cover the spaces between adjacent funnels, the path of the receptacles being generally tangent to the path of the dispensing openings.

Background of the invention

This invention relates to mechanism for dispensing measured charges of fluent material into receptacles and, more particularly, to a dispensing mechanism for discharging fluent material into a series of receptacles moving continuously through a filling station.

Summary of the invention

The primary object of the present invention is to precisely measure and dispense quantities of material at extremely high speeds with a relatively simple mechanism.

Another object is to provide an improved measuring device for dividing a continuous flow of material into measured quantities and discharging the measured quantities into successive rapidly moving receptacles with a minimum of splatter and spillage. For this purpose, the dispensing mechanism is formed with a plurality of equally spaced dispensing openings radially spaced from the axis of rotation of the mechanism, and is rotated at high speed to move each opening momentarily under a dispensing spout and over a passing receptacle to divide the flow from the spout into sections of equal length. With this arrangement, the measuring device is adaptable to receptacle carriers which move the receptacles substantially along a straight-line path.

A further object is to provide an improved measuring device of the above character which maintains its measuring accuracy in sustained service use.

Other objects and advantages of the invention will become apparent from the following detailed description taken in connection with the accompanying drawings.

Brief description of the drawings

FIGURE 1 is a fragmentary side elevational view of a portion of an automatic packaging machine embodying the novel features of the present invention.

FIG. 2 is an enlarged fragmentary cross-sectional view taken substantially along the line 2—2 of FIG. 1.

FIG. 3 is a fragmentary view similar to a portion of FIG. 2 with the parts in moved positions.

FIG. 4 is an enlarged fragmentary side elevation of the parts shown in FIG. 3, partly broken away and shown in section.

FIG. 5 is a view similar to FIG. 2 showing a modified form of the invention.

FIG. 6 is a view similar to FIG. 3 showing the modified form.

FIG. 7 is a view similar to FIG. 4 showing the modified form.

Description of the preferred embodiment

As shown in the drawings for purposes of illustration, the invention is embodied in a high-speed automatic packaging machine in which packages in the form of flexible envelope-type pouches or bags 10 having open upper ends are delivered one-by-one to clamps 11 and 12 spaced along a carrier 13 to be advanced by the carrier with a continuous motion through a filling station or zone 14 where each bag receives a measured quantity of powdered material from a filling spout 15 disposed above the path of the bags and discharging a constant flow of material. After being filled, the bags are sealed closed in a well known manner and are discharged from the machine.

In this instance, the powdered material is delivered to the bags through funnel-shaped transfer receptacles 17 equally spaced along a second carrier 18 above the bag carrier 13 and moving in unison with the bags, one funnel being disposed above each of the bags. As a bag and the associated funnel move toward the filling station 14 and the spout 15, the lower end of the funnel is lowered into open upper end of the bag to guide the charge of material into the bottom of the bag and past the upper seal areas of the bag thereby preventing contamination of the seal areas. Then, as the bag and the funnel continue on beyond the spout, the funnel is raised gradually out of the bag.

Herein, the bag carrier 13 (FIG. 1) is formed by a pair of endless chains 19 disposed in vertically spaced horizontal planes and trained around sprocket wheels (not shown) at the opposite ends of the carrier with straight runs of the chains extending along the machine through the filling station 14. Spanning the chains at horizontally spaced points are vertical blocks 20 and 21 which are fastened to both of the chains. The clamps 11 and 12 are mounted on the blocks 20 and 21, respectively, and are arranged in pairs opening toward each other to grip the leading and trailing edges of each bag on the carrier. As shown on the left in FIG. 1, the trailing clamp 12 of each pair is mounted to rock forwardly toward the leading clamp 11 to move the bag edges together and thus bow the side panels of the bag away from each other preparatory to the insertion of the funnel 17 in the bag.

Each funnel 17 is formed with an upwardly flaring upper end portion of rectangular cross-section for receiving the charge of material from the filling spout 15, and a tubular lower end portion on which a tube 22 is telescoped for vertical sliding between the raised and lowered positions shown at the extreme right and the extreme left, respectively, in FIG. 1. Two end walls 23 and two side walls 24 define the upper funnel ends. To support the funnels for movement above the bags 10, the carrier 18 also comprises two endless chains 25 (FIG. 1) disposed in vertically spaced horizontal planes above the chains 19 and trained around horizontally spaced sprocket wheels 27 and 28 at the ends of the carrier with one straight run of each of these chains above the bags on the carrier. In order to drive the carrier 18, the shaft 26 supporting the sprocket wheels 28 is drivingly connected to the main drive shaft (not shown) of the machine, and is rotated constantly in one direction.

Herein, the funnels are fastened adjacent their upper ends to vertical guides 29 which span the two chains and are connected thereto at the upper and lower ends of the guides. Each guide is formed by two vertical channel members 30 spaced apart and facing each other to define a track along which a slide 31 is movable up and down. Each slide is connected to the associated tube 22 by an arm 31a projecting outwardly from the guide.

To control the vertical position of the slides 31 and thus the tubes 22, a follower roller 32 is journaled on each slide to project inwardly beyond the guide and ride on a cam track formed by an elongated bar 33 having a downwardly inclined forward end portion 34 ahead of the filling spout 15 and an upwardly inclined rear-end portion 35. Above the forward end of the bar is a downwardly inclined cam bar 37 which shifts the rollers downwardly along the inclined portion 34 to lower the tubes into the bags 10 on the carrier 13. Then, each tube is held in this lowered position as the funnel passes beneath the spout, receives a quantity of product therefrom, and guides the product into the bag. Beyond the filling station 14, the upwardly inclined portion 35 of the cam raises the tubes gradually out of the bags before the funnels reach the sprocket wheels 28 and swing around the wheels to return to the forward end of the carrier.

In accordance with the present invention, a novel measuring device 38 is disposed below the discharge end of the filling spout 14, between the latter and the open upper ends of the funnels 17 passing the spout, to divide the flow of material from the spout into accurately measured charges and admit one charge into each funnel passing the spout. Moreover, the device is relatively simple in construction and, at the same time, is capable of extremely high-speed operation, dispensing accurately measured charges at rates of from 300 to 400 per minute, and retains its accuracy after long periods of service use.

To these ends, the measuring device 38 is mounted on the machine frame for rotation beneath the spout 15 about an axis 39 (FIG. 2) spaced laterally from the spout and in a plane extending transversely of the flow from the spout, and is formed with an annular series of angularly spaced measuring openings positioned to pass successively beneath the spout and admit successive measured quantities of material through the device into the passing funnels. The openings are separated by sections 40 sized to cover the spaces 41 between adjacent funnels on the carrier, and the measuring device and the funnel carrier 18 are driven in timed relation with each other so that the sections cover each space passing under the spout.

In the preferred form shown in FIGS. 1 through 4, the measuring device 38 comprises a central body 42 with a plurality of dividers 43 equally spaced around and projecting outwardly from the body. Each of the dividers is a generally H-shaped casting having two parallel side plates 44 spaced apart in vertical planes a distance sufficient to allow the material from the spout to flow freely between them, with a radially extending crossbar approximately midway between the ends of the side plates of sufficient width to cover a space 41 between two funnels.

To mount the dividers on the body 42, a lug 45 extends inwardly from the inner side plate 44 of each divider and is secured to the body, herein by machine screws 47 threaded into the body through flanges 48 on the lugs. In the illustrative measuring device, there are six such dividers each secured to a flat side of a hexagonal body. The body is keyed at 49 (FIG. 2) to the lower end of a supporting shaft 50 journaled on the frame for rotation about the vertical axis 39, and is held on the lower end of the shaft for rotation in a horizontal plane by a nut 51 threaded onto the shaft beneath the body.

It will be seen in FIGS. 2 through 4 that the divider crossbars form the sections 40 for covering the spaces 41 between adjacent funnels 17. The body 42 is rotated counterclockwise (FIG. 2) so that the dividers move past the spout 15 in the same direction as the funnels, from left to right as shown herein, and is rotated to move the dividers at the same linear speed as the funnels. As one funnel approaches the spout, the space 41 at the leading end of the funnel is covered by the crossbar 40 of the divider approaching the spout, and the divider remains in covering relation until after the space has passed beneath the spout. Similarly, as the trailing end of the funnel moves under the spout, the next divider on the body swings over the next space 41 and covers the latter. The spacing of the adjacent edges of two adjacent crossbars is slightly less than the length of the funnel tops so that the crossbars overhang both ends of the funnel opening.

In addition to covering the spaces 41, the crossbars 40 also determine the exact amount of material that is directed into each funnel 17 and thus into each bag 10. The adjacent cross bars in effect define the ends of a measuring opening through the measuring device. With the spacing of the crossbars, the rate of rotation of the body, and the rate of flow through the spout accurately controlled, the measurement of successive quantities of material is precise.

For a clean slicing action by each divider 43 and a minimum of spraying of material, the crossbars 40 are triangular or wedge-shaped in cross-section with their vertexes 52 (FIG. 4) adjacent the top edges of the side plates 44 and both the leading and trailing faces 53 and 54 inclined downwardly and rearwardly from the vertexes as shown most clearly in FIG. 4. The relief of the leading face reduces impacts between this face and the flowing material as a result of the forward motion of the crossbar through the flow, and also directs any material contacted downwardly rather than scattering the material outwardly. Powder falling on the trailing face 54 is deflected rearwardly into the next funnel. Thus, the equally spaced vertexes or leading edges 52 effect a precise and timed division of the flow between the passing funnels. The side plates 44 substantially eliminate loss of material deflected toward the sides of the dividers.

While the supporting shaft 50 may be driven in timed relation with the carrier 18 in various ways, herein it is rotated by a horizontal shaft 55 drivingly connected at one end to the shaft 50 through angle gearing in a cylindrical case 57 on a post 58 projecting upwardly alongside the supporting shaft, and is connected at its other end to the upper end of the sprocket shaft 26 through bevel gears (not shown) in a gear box 59 on a post 60 projecting upwardly from the frame alongside the upper end portion of the sprocket shaft. Through careful selection of the gear ratios, the shaft 50 is rotated at the proper speed to move the dividers 43 at the same linear speed as the funnels 17. For a rate of 300 bags per minute, the measuring device with six measuring openings is rotated at 50 r.p.m.

It will be evident that the measuring action takes place very rapidly, in about .2 of a second per funnel at the foregoing rate. Thus, each crossbar 40 slices quickly through the flowing material and deflects material away from a space 41 only momentarily. Once the spacing of the dividers and the rate of rotation are established, the measuring device maintains its accuracy for long periods of time in service use due to the rigidity of its supporting structure and the simplicity of its mounting. The shaft 50 is journaled in anti-friction bearings (not shown) which substantially eliminate wear and resulting looseness in the mounting of the device on the frame.

Description of the modified form

In the modified form of the invention shown in FIGS. 5 through 7, the device is a thin disk 61 formed with an annular series of arcuately curved openings 62 coaxial with the disk and separated by imperforate areas 63 which cover the spaces 41 between adjacent funnels 17. The width and arcuate length of the openings are slightly less than the corresponding dimensions of the funnel tops and the width of the imperforate sections 63 is slightly greater than the width of the spaces 41 so that the sections cover the spaces and overhang the adjacent ends of the funnels as shown in FIGS. 6 and 7. Again, the measuring device is rotated at a speed which moves the measuring openings past the spout at the same linear speed as the funnels.

The measuring action of the modified form is substantially the same as in the preferred form. After an opening 62 moves beneath the supply spout 64, material flows through the opening until the trailing edge 65 slices through the flowing material, cutting off the flow into one funnel 17. At the same time, the next funnel and measuring opening move under the spout to receive material therefrom. The thinness of the disk minimizes splattering as each section 63 moves through the flow. Of course, the edges 65 may be inclined downwardly and rearwardly in the manner of the faces 53 if desired.

In this instance, a plastic sleeve 67 of greater diameter than the width of the openings 62 is telescoped over the lower end of the delivery tube 68 of the filling spout 64 and yieldably urged into bearing engagement with the upper surface of the disk to confine the flowing material all the way to the disk. Moreover, an upturned flange 69 encircling the disk serves to collect most of the sprayed material on top of the disk. The lower end of the spout is precisely positioned over the path of the openings 62 by means of an arm 70 (FIG. 7) clamped at one end around the sleeve 67 and extending away from the spout to a bracket 71 on the frame where the other end of the arm is adjustably secured to the bracket by a screw 72 threaded into the bracket through a slot (not shown) in the arm. By adjustment of the arm relative to the bracket, the position of the lower spout end is positioned precisely as desired.

From the foregoing, it will be seen that a measuring device embodying the novel features of the present invention is relatively simple in construction and operation and yet insures accurate high speed measuring of the fluent material delivered by the spout 15. Each divider 43 covers the spaces 41 between the funnels 17 as the spaces move past the spout, and each measuring opening admits a precisely measured quantity of material into an associated funnel. Since the measuring device is mounted independently of the carrier chains, it is not affected by the flexibility of the chains or the looseness which develops in service use.

We claim:

1. In a machine for dispensing measured amounts of fluent material through a series of transfer receptacles into associated packages and having means for supporting the series of receptacles in equally spaced relation and moving the latter at a predetermined rate along a substantially straight path, and a filler disposed above said path and operable to deliver a constant volumetric flow of fluent material downwardly toward the passing receptacles to fill the packages associated with said receptacles as they pass, the improvement comprising, a measuring device disposed between said filler and said path and supported for rotation about an axis offset laterally from said path and in a plane extending transversely of said flow, said measuring device having means thereon defining an annular series of equally spaced measuring openings of preselected equal length spaced from said axis to pass successively beneath said filler as said device is rotated in one direction, said path being generally tangent to the arc of rotation of said openings whereby each receptacle moves momentarily under said arc and then on along said path, and means for rotating said measuring device continuously in said one direction at a predetermined speed to move each opening momentarily above a receptacle passing under said arc, said openings being separated by blocking sections of predetermined width for covering the spaces between adjacent receptacles on said supporting means, whereby said flow is divided by successive openings in said device and each of said receptacles receives a measured amount of material from said filler.

2. The combination defined in claim 1 in which said device comprises a rotatably mounted body and a plurality of outwardly projecting arms equally spaced around said body and defining the leading and trailing ends of said openings, the free ends of said arms being spaced apart and disposed on the other side of said filler in passing over said path.

3. The combination defined in claim 1 in which each of said sections comprises a radially extending bar of triangular cross-section having its vertex facing upwardly to precisely divide the flow from said spout.

4. The combination defined in claim 3 in which the leading and trailing faces of said bars are inclined downwardly and rearwardly relative to the direction of motion of said bars.

5. The combination defined in claim 1 in which said device is a disk having an annular series of arcuately curved openings adjacent its periphery and coaxial with the disk, said portions comprising imperforate areas of said disk between adjacent openings of said series.

6. The combination defined in claim 1 in which said filler includes a spout formed by a delivery tube terminating above said disk and a plastic sleeve of greater diameter than the width of said openings telescoped with said tube and bearing against the top surface of the disk to confine said flow all the way to the disk.

7. The combination defined in claim 1 further including an annular flange projecting upwardly from the periphery of said disk to confine sprayed material to the top of the disk.

8. The combination defined in claim 1 in which said supporting means comprises an endless flexible chain having a substantially straight run extending beneath said arc and adapted to be driven independently of said measuring device at high speed to advance receptacles along a straight line and one-by-one past said measuring device.

References Cited

UNITED STATES PATENTS

| 1,925,273 | 9/1933 | Norgaard | 141—133 X |
| 2,030,541 | 2/1936 | Rose | 141—131 X |
| 2,785,707 | 3/1957 | Ryan et al. | 141—1 |
| 2,932,329 | 4/1960 | Gardner et al. | 141—132 |

FOREIGN PATENTS

| 830,323 | 2/1952 | Germany. |

LAVERNE D. GEIGER, *Primary Examiner.*

E. J. EARLS, *Assistant Examiner.*